Jan. 23, 1940.                P. A. KINZIE                2,187,787
                                  VALVE
                           Filed May 24, 1938
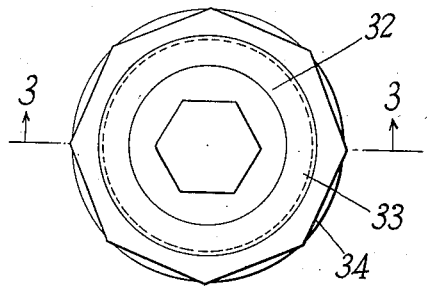
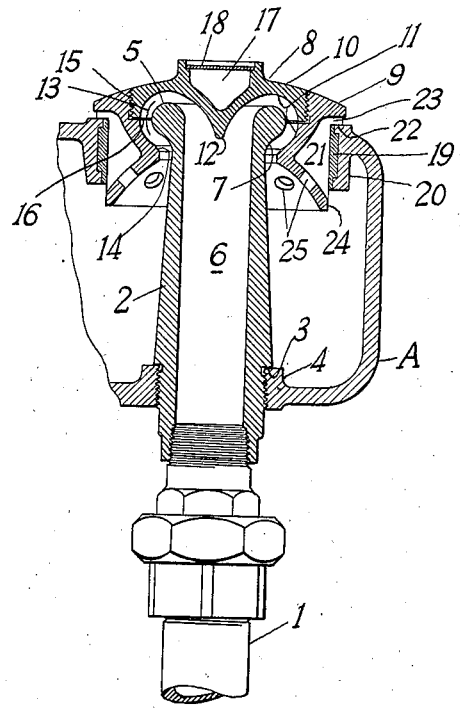
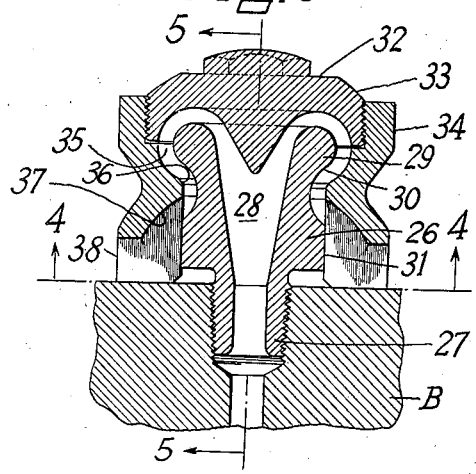
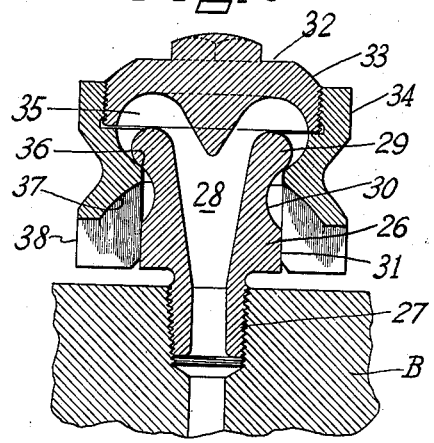
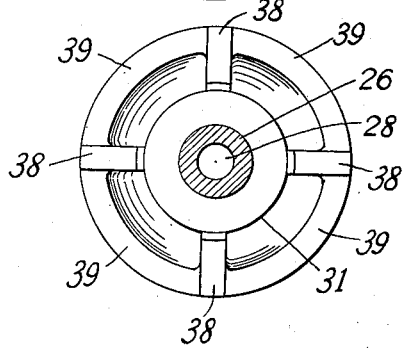
INVENTOR.
Phillip A. Kinzie
BY
ATTORNEY.

Patented Jan. 23, 1940

2,187,787

UNITED STATES PATENT OFFICE 2,187,787

VALVE

Phillip A. Kinzie, Denver, Colo., assignor to Universal Hydraulic Corporation, Denver, Colo., a corporation of Colorado Application May 24, 1938, Serial No. 209,664

10 Claims. (Cl. 251—127)

This invention relates to valves of the venting type such as disclosed in U. S. Letters Patent 1,998,458 granted to applicant April 23, 1935, and in the continuing application, Ser. No. 738,204, filed August 3, 1934, now pending; the valves being adapted for operation where combinations of liquid and gas are present to automatically relieve gaseous pressure while preventing escape of liquid therethrough.

Principally, the invention contemplates an automatic control valve so constructed as to distinguishingly react to differentiate between liquids and gases according to fluid flow principles, and thus avoiding the use of any of the usual float mechanisms.

More particularly the invention comprises a body having a reaction valve cap which, together with the body, forms a passage through which a lighter fluid such as air may pass at high velocity without raising the cap to its seat and cutting off the flow, but which is immediately raised to its seat by heavier fluids such as water at the same or even less velocity.

The valve of the present invention is particularly suitable for use in hydraulic apparatus such, for instance, as in connection with the relief of air from tanks or turbine scrolls, and is also effectively used in connection with pressure operated control valves of the type described in said U. S. Patent 1,998,458, where quick response, and hence instantaneous action of the relief valve is an essential feature.

With the foregoing in view, I shall now describe the invention in detail as illustrated in the accompanying drawing forming a part hereof and wherein:

Fig. 1 is a central sectional side elevation of a valve embodying the present invention and in its relief, or open condition;

Fig. 2 is a top plan view of a slightly modified form of valve;

Fig. 3 is a central sectional side elevation of the form of valve shown in Fig. 2 in the open or relief condition on the line 3—3 of Fig. 2;

Fig. 4 is a plan view, in section, on the line 4—4 of Fig. 3;

Fig. 5 is a view similar to Fig. 3 showing the valve in the closed condition, and the section is taken on the line 5—5 of Fig. 3.

With reference to Fig. 1, a vent pipe 1 communicates with the impulse tube 2 threaded adjacent to its lower end and provided with a shoulder 3 seating against a similarly threaded boss 4 of, for instance, a manifold A when the tube 2 is introduced from the top of the said manifold through the opening therein, as shown. The meeting faces of the shoulder 3 and boss 4 are machined to support the tube 2 in an upright position.

Above the shoulder 3 the tube is taperingly extended with a constantly decreasing outer diameter until, near its upper end, this tapering reduction merges into an outwardly flaring curved fillet or lip 5 which imparts to the top of the tube a diameter somewhat greater than that of the shoulder 3. The curvature of the fillet is continued around the end of the tube and merges with the cylindrical wall surface of the interior passage 6, thus forming an annular rim of smooth contour at the upper limit of the tube and providing a gradual enlargement of the passage 6 adjacent its outlet end. In providing a formation of this character, the upper end of the tube is made substantially circular in cross section, as seen in Fig. 1, and merges with the tapered outer wall of the tube along the arc 7.

The valve unit 8, consisting of the plunger 9 and cap 10, is mounted in the manifold A for reciprocable movement axially of the tube 2, being provided on its interior with a recess 11 within which the filleted end 5 of the tube 2 is received. The interior recess 11 is of annular formation about the central conical point 12, and in contour conforms generally to that of the filleted end 5 of tube 2, being also substantially circular in cross section and having a substantial portion thereof concentric with the surface of the filleted end 5 when the valve is open for relief of air therethrough. Thus, the curving filleted lip 5 and the surrounding valve member 8 are so shaped that surface portions thereof cooperate to provide an outwardly expanding annular fluid passage 13 from the central passage 6 of the impulse tube 2. The recess 11 terminates in a seat portion 14 having an inclination preferably of at least 30 degrees relative to the central axis; thus when the valve is raised to its closed position the seat 14 is brought into contact with the undersurface of fillet 5 and escape of liquid is prevented.

The annular expanding passage 13 causes fluid impinging at the conical point 12 of the valve cap, concentric with the axis of the passage 6 in the tube 2, to be expanded radially outwardly away therefrom, and to simultaneously and progressively change its direction of flow from a course coincident with the axis of the tube 2 until such course of flow has finally been turned upon itself approximately 200°.

The expanding fluid passage 13 allows air to pass from the tube 2 under high velocity without causing closure of the valve, but as soon as liquid, or heavier fluid, under any considerable velocity impinges upon the curving surfaces of the movable valve element 8, the energy of the moving mass reacts upon those surfaces to produce vertical upward motion to close the valve 8 against the filleted element 5 and prevent the escape of the heavier fluid.

When the heavier pressure fluid, such as liquid strikes the valve member 8 it immediately moves to its uppermost closed position and remains there so long as liquid pressure is present within the tube 2, and as the pressure recedes to nearly that of atmosphere, the weight of the movable valve element 8 causes it to drop to the open position shown in Fig. 1 thereby again allowing air to escape.

The entrance to the annular passage 13 is made substantially parallel to the original course of the stream through passage 6, or with a minimum diversion of the stream, due to the conical point 12 being positioned within the flared end of the vent passage 6, and adjacent surfaces providing gradual variations in the course of the liquid, thus promoting smooth flow throughout, and avoiding turbulence or other disturbing agitation. Consequently, the particular formation of the passage 13 provides reaction surfaces whereby energy of the moving liquid is effectively utilized, by converting its velocity head into pressure head and causing the valve member 8 to be raised to its closed position. However, the passage 13 is particularly favorable to the unrestricted passage of a more tenuous fluid, such as air, being of smooth contour and of gradually increasing area, and allowing the air to flow readily around the gradually curving passageway without producing closure, at velocities corresponding to that of the liquid or even at velocities considerably greater. Consequently, with the parts so proportioned as to increase the range of velocities over which the lighter fluid is ineffective, a positive and automatic differentiation is made between the streams of liquid and air, and closure occurs only in response to the heavier fluid.

As shown, the movable valve element 8 is formed of the plunger 9 and cap 10 which are matingly threaded together at 15, and have companionate facing surfaces meeting substantially in a plane 16 normal to the central axis of the tube 2 and passing through the center of curvature of the fillet 5 and of the annular recess 11. A cavity 17 is formed in the outer surface of the cap in order to reduce its weight, a disc 18 being peened into position across the cavity as a seal against heavy accumulations of dirt or other materials. By the arrangement and construction of the valve member 8 with separable parts, the interior curving impulse surfaces can be smoothly machined, the base of the tube 2 passed through the throat seat 14 in the plunger 9, the cap 10 then screwed to place, and the parts thus assembled inserted into the non-corrodible metal liner 19 in the top surface of manifold casting A; the lower threaded portion of tube 2 being then entered and screwed into the tapped hole in the boss 4 formed on the bottom surface of the manifold casting.

The manifold body A consists of a hollow structure accommodating one or more automatic air valves, a cylindrically bored boss 20 being provided in the top surface of the casting A to receive the liner 19 of each valve, and each boss being machined upon its upper face. The movable member 8 is reciprocatingly received within the bore of the liner 19 and is guided in its vertical movements therein by radial ribs 21 formed on the plunger 9 and turned to a loose sliding fit within the liner.

The upper portions of the ribs 21 are each provided with a finished shoulder 22 which rests upon the top finished face of the boss 20 when the valve is open and thereby positions the plunger 9 so that an annular space 23 is provided between the underside of the rim of the plunger and the opposing upper face of the boss 20 through which the air coming from the vent pipe below escapes.

Each plunger 9 is provided with an expanding dome shaped skirt 24 at its lower extremity which prevents any liquid from escaping through the annular space around the plunger above, such liquid being deflected downwards by the skirt into the interior of the manifold casting A, from which it is drained away by suitable means, such as described in the Patent No. 1,998,458, hereinbefore mentioned. The dome shaped skirt provides an expanding annular fluidway, concentrically disposed with respect to the impulse tube 2, within which any fluid entering from above under relatively high velocity forms a vertical vortex which quickly reduces its velocity to a low value as it enters the manifold casting. Openings 25 are provided through the skirt 24 to allow air to escape therethrough, and these openings are so positioned that while they freely pass air, liquid under high velocity passing along the inner concave surface of the skirt will, due to the inertia of its greater mass, pass across these holes without escaping therethrough. These openings 25 are equally spaced circumferentially around the skirt in sufficient numbers so that their combined areas in each plunger 9 are greater than that of the passage 6 in tube 2, thereby providing ample escape area for the air passing through each valve.

With the general arrangement and relative shape and cooperation of parts as herein illustrated, these valves have been found by actual tests to pass relatively large quantities of air under high velocities, and to close quickly with little if any impact as soon as liquid reaches them, and to avoid spilling of liquid outside of the manifold body. By making the guide ribs 21 on the plunger 9 narrow and loosely fitted in the bore of the liner 19 in the top of the manifold casting and by making the female valve seat 14 as a hollow conical surface contacting the mating rounded fillet surface 5 of the male seat, forming in effect a ball and socket joint, yet making only line contact at the seats, practically perfect freedom of the moving element to adjust itself to the fixed element is afforded, thus insuring a tight seat at low pressures, and at the same time permitting movement to seat or unseat with a minimum of friction so that the weight of the moving valve unit 8, consisting of the parts 9, 10 is always more than ample to insure opening of the valve as soon as the pressure upon its interior is released.

The type of valve shown in Figures 2 to 5 inclusive, is a modification of that just described, and the action of the same being identical with that of Figure 1, reference will be made only to the differences in construction.

In this modified form of valve the tube 26, threaded at its lower end 27 into the body B, has an upwardly flaring central passage 28, the top of which curves over annularly into the fillet 29 and is then reversely curved as at 30, the lower cylindrical surface 31 providing a guide for the valve member 32 which comprises the cap member 33 and valve body or plunger 34 threaded together as shown and interiorly shaped to cooperate with the exterior of the tube 26 to provide the curved annular passageway 35 corresponding to the passage 13, in function, of the valve described in connection with Figure 1. The plunger 34 is provided with a conical seating surface at 36. The lower portion of the plunger 34 is provided with a downwardly flaring skirt 37 and with vertical guides 38 which form between them the outlets 39 for the fluid when the valve is open.

The valve is shown in the open condition in Figure 3 and in the closed condition in Figure 5. It is assembled by first placing the valve body 34 in concentric position with respect to the passage in body B and then screwing the tube 26 in place by any suitable means, after which valve cap 33 is screwed into the valve body 34.

While, in the foregoing, specific types of valves have been described in order to comply with the patent statutes, it is nevertheless to be understood that I claim any and all types of valves falling within the scope of the appended claims defining my invention.

I claim:

1. A valve of the venting type comprising a stationary tube having one end adapted to receive fluid streams of different densities and having its opposite end terminating in a fillet of rounded contour merging with adjacent surface portions interiorly and exteriorly of said tube, a valve member reciprocable relative to said tube in response to movement of the heavier fluid and having its interior surface annularly recessed to a form substantially paralleling the contour of said filleted end and surroundingly spaced therefrom to provide an unobstructed annular passage of smooth continuous curvature and outwardly increasing cross-section communicating with the interior of said tube, said passage having its outlet disposed rearwardly of said fillet, and means including said member for effecting closure of said outlet.

2. A valve of the venting type comprising an impulse tube adapted for support in an upright position and having an upwardly flaring central passage at its upper end, said end having an annular fillet formation merging with said flaring passage and joined to the outer wall surface along an arc reversely curved to provide a reduction in the diameter of said tube below said fillet, a valve member surrounding said upper filleted end and means guiding said member for reciprocating movement axially of said tube, said member having its interior surface recessed to provide in cooperation with said fillet an outwardly expanding annular passage curving radially throughout approximately 200°, said recess being annularly formed about a conical extension directed toward said flaring passage whereby fluid entering said passage from said tube is gradually deflected from its original upward course for discharge from said passage below said fillet.

3. In combination, an impulse tube adapted for upright mounting and having its outer diameter a minimum at an intermediate location, said tube flaring outwardly from said minimum diameter in a curving fillet at its upper end, a valve member comprising separable parts including a plunger and a cap joined together, means forming an annular passage about said fillet and communicating with said impulse tube comprising an inner surface portion of said member cooperatingly recessed relative to said fillet and terminating in a throat opening adjacent the minimum diameter of said tube, and means guiding said valve member for reciprocating movement axially of said fillet including radially disposed spaced ribs on said member.

4. In combination, an impulse tube adapted for upright mounting and having its outer diameter a minimum at an intermediate location, said tube flaring outwardly from said minimum diameter in a curving fillet at its upper end, a valve member comprising separable parts including a plunger and a cap joined together, means forming an annular passage about said fillet and communicating with said impulse tube comprising an inner surface portion of said member cooperatingly recessed relative to said fillet and terminating in a throat opening adjacent the minimum diameter of said tube, and means guiding said valve member for reciprocating movement axially of said fillet including radially arranged ribs on said plunger extending below said throat and engaging a cylindrical exterior portion of said tube.

5. In a valve of the venting type, the combination including an impulse tube having a central passage curving outwardly at its upper end into an outwardly flaring fillet of rounded contour, the outer surface of said tube being taperingly reduced toward said upper end and then gradually curved outwardly to merge with said fillet, a reciprocable valve member consisting of a plunger portion and a cap fitted thereto, means for guiding said member for movement axially of said tube, and means forming a gradually expanding annular passage surrounding said filleted end comprising recessed inner surface portions on said plunger and cap cooperatingly disposed relative to said fillet, said plunger having a lower portion of its inner surface formed at an angle of at least 30° to its axis to provide a conical seat for engagement with the undersurface of said fillet.

6. A valve for relieving the pressure of gaseous fluids while restricting the flow of liquids comprising a vent tube and a movable valve member each having portions formed as surfaces of revolution about the axis of said tube to provide an outwardly flaring filleted formation at the upper end of said tube and to cooperatingly provide an annular flow passage surrounding said filleted end, said passage being in communication with the interior of said tube and having an outlet from its lower portion of a diameter less than the diameter of said fillet, said cooperating surfaces having portions thereof of concentrically circular cross section and said valve member being formed of separable parts joined together in a plane passing through the common center of curvature of said surfaces, one of said parts being disposed above said vent tube and having the central portion of its inner surface terminating in a conical point extending within the upper end of said tube and having a sealed cavity formed in its outer surface above said conical extension.

7. A valve of the venting type for operation where combinations of liquid and gaseous fluids are present comprising an impulse tube adapted to conduct rapidly moving streams of such fluids entering successively at its lower end, a valve member cooperating with the upper end of said tube to provide a surrounding passage directing fluids from said tube along reaction surfaces curving outwardly through an angle of approximately 200°, said passage having opposite defining surfaces of smooth contour and formed as surfaces of revolution about the central axis of said tube and having substantial portions of the respective surface elements circular and concentrically arranged to provide a gradual expansion of area in the direction of fluid flow, said defining surfaces constituting means whereby the energy of a stream of liquid moving at relatively high velocity reacts with said surfaces to exert an upward force on said valve member to close said passage, and whereby the effectiveness of a similar stream of gaseous fluid is diminished, irrespective of its relative density, at a corresponding velocity, or at a substantially higher velocity than that of the liquid, thus enabling the valve to automatically and positively differentiate between streams of liquids and gases in order to permit gas to pass readily therethrough while escape of the liquid is prevented.

8. In combination with a valve manifold, an impulse tube supported in an upright position within the manifold and adapted to successively receive rapidly moving streams of liquid and gaseous fluids at its lower end, a valve member surrounding the upper end of said tube each having cooperating surface portions concentrically arranged and normally spaced to provide a curving passage of gradually increasing area whereby the fluids are directed from the upper end of said tube and discharged through a throat opening surrounding said tube at a lower level within said manifold, said valve member having means below said throat for reducing the discharge velocity of said fluids, means forming an outlet for the gaseous fluid from the upper portion of said manifold and means for removing liquid from its lower portion.

9. In combination with a valve manifold, an impulse tube supported in an upright position within the manifold and adapted to successively receive rapidly moving streams of liquid and gaseous fluids at its lower end, a valve member surrounding the upper end of said tube each having cooperating surface portions concentrically arranged and normally spaced to provide a curving passage of gradually increasing area whereby the fluids are directed from the upper end of said tube and discharged through a throat opening surrounding said tube at a lower level within said manifold, said manifold having means within its upper wall surface for guiding said valve member in movements axially of said tube, said member being formed of separable parts including a lower plunger portion terminating in a downwardly flaring skirt formation below said discharge throat, whereby the discharge velocity of the liquid is substantially reduced.

10. In combination with a valve manifold, an impulse tube supported in an upright position within the manifold and adapted to successively receive rapidly moving streams of liquid and gaseous fluids at its lower end, a valve member surrounding the upper end of said tube each having cooperating surface portions concentrically arranged and normally spaced to provide a curving passage of gradually increasing area whereby the fluids are directed from the upper end of said tube and discharged through a throat opening surrounding said tube at a lower level within said manifold, said valve member including a separable plunger portion having outwardly extending radial ribs, said manifold having means within its upper wall surface for receiving said ribbed portion and guiding said member in movements axially of said tube, said plunger portion having a downwardly flaring skirt below said throat and openings through said skirt of combined area at least equal to the internal area of said impulse tube.

PHILLIP A. KINZIE.